United States Patent
Woo et al.

(10) Patent No.: US 7,870,077 B2
(45) Date of Patent: Jan. 11, 2011

(54) SYSTEM AND METHOD FOR BUYING GOODS AND BILLING AGENCY USING SHORT MESSAGE SERVICE

(75) Inventors: Kang-Suk Woo, Seoul (KR); Hee-Son Park, Seoul (KR); Hoon-Bae Kim, Seoul (KR); Gap-Chun Back, Uijeongbu-si (KR)

(73) Assignee: KT Corporation, Seoul (KR)

( * ) Notice: Subject to any disclaimer, the term of this patent is extended or adjusted under 35 U.S.C. 154(b) by 668 days.

(21) Appl. No.: 11/097,865

(22) Filed: Apr. 1, 2005

(65) Prior Publication Data

US 2005/0171909 A1    Aug. 4, 2005

Related U.S. Application Data

(63) Continuation of application No. PCT/KR03/00169, filed on Jan. 27, 2003.

(30) Foreign Application Priority Data

Oct. 2, 2002    (KR) ...................... 10-2002-0060243

(51) Int. Cl.
    *G06Q 20/00*    (2006.01)
(52) U.S. Cl. .............................. 705/78; 705/64; 705/75; 705/79; 705/16; 705/39; 235/379; 235/380; 902/2
(58) Field of Classification Search .................. 705/16, 705/39, 64, 75, 78, 79; 235/379, 380; 902/2
See application file for complete search history.

(56) References Cited

U.S. PATENT DOCUMENTS

| | | | | |
|---|---|---|---|---|
| 5,343,529 A | * | 8/1994 | Goldfine et al. ................ | 705/75 |
| 5,826,245 A | * | 10/1998 | Sandberg-Diment ......... | 705/44 |
| 5,839,119 A | * | 11/1998 | Krsul et al. .................... | 705/39 |
| 5,883,810 A | * | 3/1999 | Franklin et al. .............. | 700/232 |
| 5,960,411 A | * | 9/1999 | Hartman et al. ............... | 705/26 |
| 5,983,200 A | * | 11/1999 | Slotznick ...................... | 705/26 |

(Continued)

FOREIGN PATENT DOCUMENTS

DE      100 58 249 A1    6/2002

(Continued)

OTHER PUBLICATIONS

Supplementary European Search Report for corresponding European Patent Application No. EP 03 70 3428 dated Oct. 10, 2008 by European Patent Office.

*Primary Examiner*—Calvin L Hewitt, II
*Assistant Examiner*—Mamon Obeid
(74) *Attorney, Agent, or Firm*—Knobbe Martens Olson & Bear LLP

(57) ABSTRACT

A system and method for buying goods and billing agency using short message service are disclosed. If a purchaser transmits goods information to a mobile communication service system using short message service of a mobile phone, the mobile communication service system generates a certification code corresponding to the goods information and transmits it to a shopping mall server and the mobile phone. Then, the shopping mall server and the mobile phone exchange messages and run mutual authentication. Thereby, system construction expense for selling goods and service is decreased, purchasing procedure is simple, and the safe purchase can be done by mutual authentication using the certification code.

4 Claims, 5 Drawing Sheets

U.S. PATENT DOCUMENTS

| | | | |
|---|---|---|---|
| 6,204,774 B1* | 3/2001 | Miwa et al. | 340/5.2 |
| 6,324,526 B1* | 11/2001 | D'Agostino | 705/44 |
| 6,487,540 B1* | 11/2002 | Smith et al. | 705/21 |
| 6,577,861 B2* | 6/2003 | Ogasawara | 455/419 |
| 7,292,999 B2* | 11/2007 | Hobson et al. | 705/65 |
| 7,346,577 B1* | 3/2008 | Williams et al. | 705/40 |
| 2001/0025271 A1* | 9/2001 | Allen | 705/65 |
| 2001/0049636 A1* | 12/2001 | Hudda et al. | 705/26 |
| 2002/0065693 A1* | 5/2002 | Hattori et al. | 705/7 |
| 2002/0131444 A1* | 9/2002 | Moodie et al. | 370/463 |
| 2002/0147690 A1* | 10/2002 | Tam et al. | 705/64 |
| 2002/0187774 A1* | 12/2002 | Ritter et al. | 455/414 |
| 2003/0009374 A1* | 1/2003 | Moodie et al. | 705/14 |
| 2003/0132298 A1* | 7/2003 | Swartz et al. | 235/472.02 |
| 2003/0171993 A1* | 9/2003 | Chappuis | 705/16 |
| 2004/0019564 A1* | 1/2004 | Goldthwaite et al. | 705/44 |
| 2004/0250068 A1* | 12/2004 | Fujisawa et al. | 713/168 |
| 2005/0261984 A1* | 11/2005 | Hutchison et al. | 705/26 |
| 2008/0071641 A1* | 3/2008 | Olson | 705/26 |

FOREIGN PATENT DOCUMENTS

| | | |
|---|---|---|
| EP | 1 178 444 A | 2/2002 |
| GB | 2371123 A | 7/2002 |
| KR | 2001-25740 | 4/2001 |
| KR | 2002-0038916 | 5/2002 |
| KR | 2002-78359 | 10/2002 |
| WO | WO 98/47116 A | 10/1998 |
| WO | WO 99/67938 A | 12/1999 |
| WO | WO 02/11082 A1 | 2/2002 |
| WO | WO 02/061699 | 8/2002 |

* cited by examiner

SYSTEM AND METHOD FOR BUYING GOODS AND BILLING AGENCY USING SHORT MESSAGE SERVICE

RELATED APPLICATIONS

This application is a continuation application, and claims the benefit under 35 U.S.C. §§120 and 365 of PCT Application No. PCT/KR2003/000169, filed on Jan. 27, 2003 and published on Apr. 15, 2004, in English, which is hereby incorporated by reference.

BACKGROUND OF THE INVENTION

1. Field of the Invention

The present invention relates to a method for buying goods and executing as proxy for billing with SMS (Short Message Service) and more specifically to a method for buying goods and executing as proxy for billing with short message service, thus decreasing a construction cost of system for buying goods and service, simplifying a buying process and providing secured purchase to the buyer with cross certification through an authentication code.

2. Description of the Related Technology

Recently it has been common for shoppers to buy goods and services in online shopping malls and television shopping malls instead of visiting shopping centers or service companies directly.

In the television home shopping malls, shoppers have been using Audio Response System (hereinafter referred to as ARS) to select goods and services when they shop over the TV. However it inevitably requires high priced systems like a conventional audio response system to be constructed.

Further, the shoppers have to listen to the guide of ARS for relatively a long time in order to select goods and service they want and meantime, there are possibilities to be confused or make an error in the selection of goods or services.

In the online shopping malls, there are some inconveniences that shoppers have to input purchase information each time, which is necessary to buy, like telephone number, account number, secret number and/or the like and become of a member of the online shopping malls to buy goods

SUMMARY OF CERTAIN INVENTIVE ASPECTS

One aspect of the invention provides a method of buying goods and executing as proxy for billing with SMS to decrease the construction cost of system, by buying goods or service, or selling goods or service without employing the high priced system like ARS.

Another aspect of the invention provides a method of buying goods and executing as proxy for billing with SMS not only to simplify the buying process by the mobile communication service system executing as proxy for billing but also for the buyer to safely buy goods with the cross certification through the authentication code.

Another aspect of the invention provides a method of buying goods and billing therefore using short message service in a mobile telecommunication network, the method comprising: receiving goods information from a mobile terminal (for example, a predetermined goods or service code according to goods or service); generating an authentication code corresponding to the goods information to approve cross certification between a buyer and a shopping mall server; transmitting the authentication code to the mobile terminal through a SMSC; generating purchase information including the goods information and the authentication code; transmitting the purchase information to the shopping mall server; receiving a message for canceling transaction or a message for requesting of a billing about the goods that the buyer requested to buy from the shopping mall server (for example, the goods price corresponding to the goods for the buyer to request to buy); and providing the billing in the case of receiving the message for requesting of the billing. There is provided with a system, server device and computer-readable medium suitable for buying goods and billing therefore using short message service.

In one embodiment, the method further comprises: transmitting the message for canceling transaction to the mobile terminal through the SMSC in the case of receiving the message for canceling transaction; providing a billing about the goods for the buyer to buy and transmitting the message for the complete billing to the shopping mall server in the case of receiving the message for requesting of the billing; and transmitting the message for complete transaction to the mobile terminal through the SMSC.

In one embodiment, the providing of the billing in the case of receiving a message for requesting of the billing comprises: generating transaction particulars corresponding to the goods for the buyer to buy (for example, the transaction particulars includes at least the goods code and the goods price); transmitting the transaction particulars to a billing system for providing the billing for a mobile communication service which is to claim a mobile communication service charge.

Another aspect of the invention provides a method of buying goods and executing as proxy for billing with SMS in a mobile telecommunication network, the method comprising: receiving goods information about goods which a buyer requested to buy from a mobile terminal, wherein the goods information includes at least predetermined goods code according to goods and service; generating a primitive authentication code corresponding to the goods information in order to permit cross certification between the buyer and a shopping mall server; storing the primitive authentication code; partitioning the primitive authentication code into the first authentication code and the second authentication code with predetermined partition algorithm; transmitting the first authentication code to the mobile terminal through the SMSC; generating purchase information including the goods information and the second authentication code; transmitting the purchase information to the shopping mall server; receiving the first source code or the second source code from the shopping mall server (for example, the first source code may be generated in the shopping mall server with the same manner that the first authentication code and the second authentication code are generated with the predetermined synthetic algorithm and the second source code is identical to the second authentication code); generating a synthetic authentication code with the first source code or the second source code; ascertaining whether or not the synthetic authentication code is identical to the pre-stored primitive authentication code; and providing a billing when the synthetic authentication code is identical to the primitive authentication code.

In one embodiment, the generating of the synthetic authentication code with the first source code or the second source code comprises: storing the first source code as the synthetic authentication code when the first source code is received; and generating the synthetic authentication code by synthesizing the first authentication code and the second source code with the synthetic algorithm when the second source code is received.

In one embodiment, the method further comprises: transmitting a message for canceling transaction to the mobile terminal or the shopping mall server through the SMSC when the synthetic authentication code is not identical to the primitive authentication code; providing a billing for the goods which the buyer requested and transmitting a message for complete billing to the shopping mall server when the synthetic authentication code is identical to the primitive authentication code; and transmitting a message for complete transaction to the mobile terminal through the SMSC.

In one embodiment, the providing of the billing when the synthetic authentication code is identical to the primitive authentication code comprises: generating transaction particulars corresponding to the goods which the buyer requested (for example, the transaction particulars includes at least the goods code and the goods price); and transmitting the transaction particulars to a billing system for providing a billing for the mobile communication service to claim the mobile communication service charge of the buyer.

Still another aspect of the invention provides a the method of buying goods and executing as proxy for billing with SMS in the mobile telecommunication network, the method comprising: receiving goods information about goods which the buyer requested to buy from a mobile terminal (for example, the goods information includes at least predetermined goods code according to goods and service); generating two separate authentication codes of which one is the first authentication code and the other is the second authentication code corresponding to the goods information in order to permit cross certification between the buyer and a shopping mall server; storing the first authentication code and the second authentication code as the first primitive authentication code and the second primitive authentication code each; transmitting the first authentication code to the mobile terminal through a SMSC; generating purchase information including the goods information and the second authentication code; transmitting the purchase information to the shopping mall server; receiving the first authentication code from the mobile terminal; receiving the second authentication code from the shopping mall server; ascertaining whether or not the first authentication code and the first the primitive authentication code are identical; ascertaining whether or not the second authentication code and the second the primitive authentication code are identical; and providing a billing when the first authentication code and the first primitive authentication code, and the second authentication code and the second primitive authentication code are identical respectively.

In one embodiment, the method further comprises: transmitting a message for canceling transaction to the mobile terminal through the SMSC, when the first authentication code and the first the primitive authentication code are not identical or the second authentication code and the second the primitive authentication code are not identical; transmitting the message for canceling transaction to the shopping mall server; providing a billing for the goods which the buyer requested to buy and transmitting a message for complete billing to the shopping mall server when the synthetic authentication code is identical to the primitive authentication code when the first authentication code and the first primitive authentication code, the second authentication code and the second primitive authentication code are identical respectively; and transmitting a message for complete transaction to the mobile terminal through the SMSC.

In one embodiment, the providing of a billing, when the first authentication code and the first primitive authentication code, the second authentication code and the second primitive authentication code is identical, respectively, further comprises: generating transaction particulars corresponding to the goods which the buyer requested to buy (for example, the transaction particulars includes at least the goods code and the goods price); and transmitting the transaction particulars to the billing system for providing a billing for the mobile communication service in order to claim mobile communication service charge of the buyer.

Yet another aspect of the invention provides a method of buying the goods and executing as proxy for billing with SMS in the mobile telecommunication network, the method comprising: receiving selection information about settlement way from the mobile terminal (for example, the selection information about settlement way includes at least one selected from joint request with mobile fee, credit card settlement, account transfer, deposit without passbook); requesting of input of credit information to the mobile terminal for billing when the settlement way is the credit card settlement (for example, the credit information includes at least one chosen from credit card number, credit card effective period and secret number); receiving the credit information from the mobile terminal; transmitting a message for requesting of settlement about an amount of money corresponding to the goods price to a credit card server for providing credit card service; and receiving a message for complete settlement from the credit card server.

DETAILED DESCRIPTION OF CERTAIN INVENTIVE EMBODIMENTS

Figure 1:
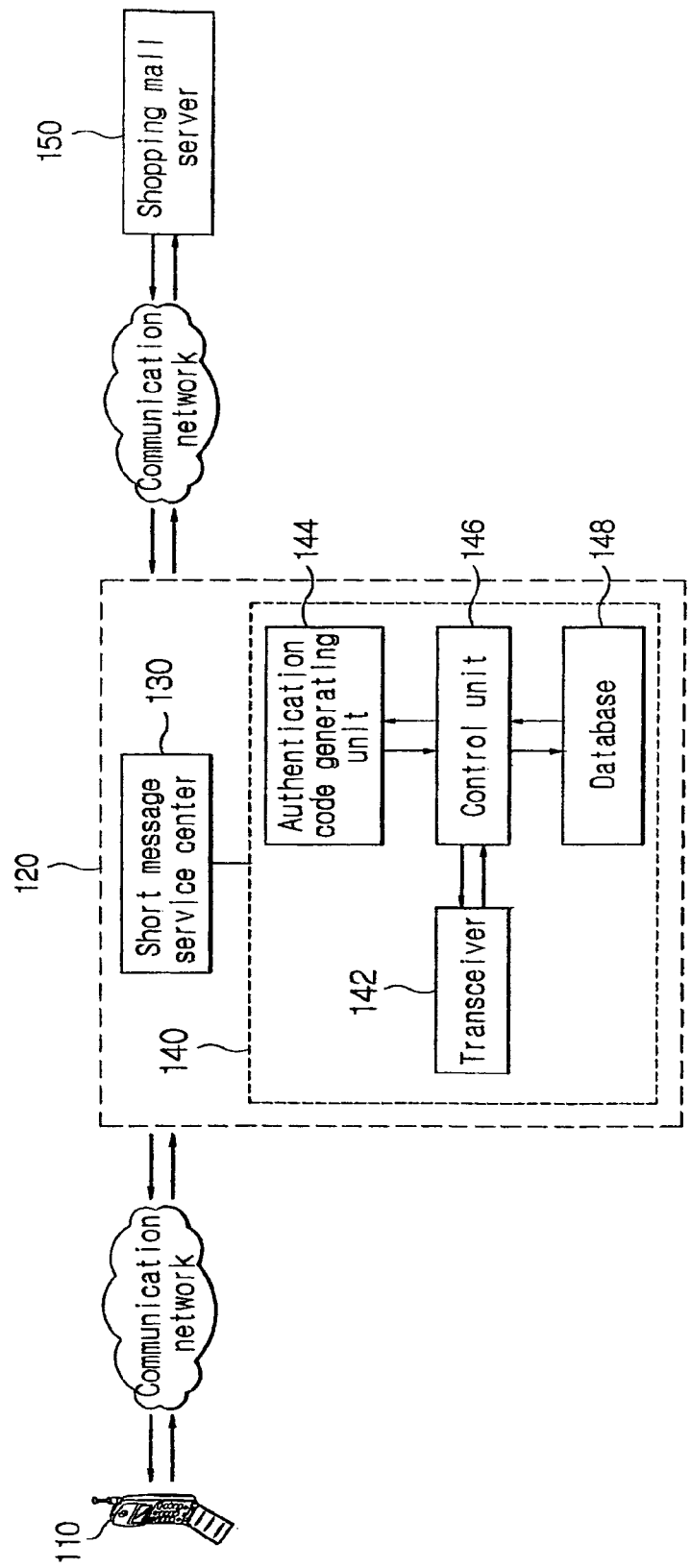
FIG. 1 is an entire schematic diagram of system for buying goods and executing as proxy for billing with SMS.

FIG. 1 is an entire schematic diagram of system for buying goods and executing as proxy for billing with SMS according to one embodiment of the present invention.

Referring to FIG. 1, the system for buying goods and executing as proxy for billing with SMS according to the present invention can include a mobile terminal 110, a mobile telecommunication service system 120, a shopping mall server 150, and the like.

The mobile terminal 110 is the device which transmits and receives a short message with SMSC (Short Message System Center) 130 and gives and takes information through a communication network when a buyer buys goods and service in a television home shopping or online shopping malls.

FIG. 1 illustrates only a cellular phone 110 for the convenience, but if the device can provide SMS through the communication network by including telecommunication functions by itself like notebook computer, PDA (Personal Digital Assistants) and the like, it is not limited within the cellular phone.

The mobile telecommunication service system 120 includes SMSC 130, MC-T (Mobile Commerce Transparency device) 140 and the like, and is the system which provides all the service related to the mobile communication coupled with the communication network.

The SMSC 130 is the device which transmits and receives short message with the mobile terminal 110, gives and takes signal coupled with MC-T 140.

In this place, the short message comprised of characters, numbers or simple symbols in the text form with 80 byte (English 80 characters, Korean 40 characters), can be used in all the mobile phones irrespective of using the mobile internet, and coupled with CDMA (Code Division Multiple Access) and PCS (Personal Communication Service) network.

The MC-T 140 receives a code corresponding to the goods which the buyer requested to buy from the mobile terminal 110, generates the authentication code by the goods, transmits the generated authentication code to the mobile terminal 110 and the shopping mall server 150 through the SMSC 130, if necessary, compares the authentication code with the authentication code received from the mobile terminal 110 and the shopping mall server 150, and accomplishes the process after comparison according to the results of the comparison. Also, after the process for buying the goods and executing as proxy for billing is completed, it generates the transaction particulars and transmits it to the billing system for providing a billing for the mobile communication service.

The MC-T 140 can include a transceiver 142, an authentication code generating unit 144, a control unit 146, database 148 and the like.

The transceiver 142 coupled with the mobile terminal 110 and SMSC 130 and the shopping mall server 150 transmits and receives the signal like goods information, the purchase information and the authentication code and the like which are necessary in goods purchase process.

The authentication code generating unit 144 receives the goods information from the mobile terminal 110 of the buyer, and generates the authentication code corresponding to the received goods information.

The control unit 146 controls the authentication code generating unit 144 and the database 148 with the data inputted and outputted through the transceiver 142.

The database 148 stores buyer information, the goods information and the authentication code.

The shopping mall server 150 is the device which provides the sales service about the goods and service to the buyer and examples thereof include the television home shopping and online shopping mall.

Figure 2:
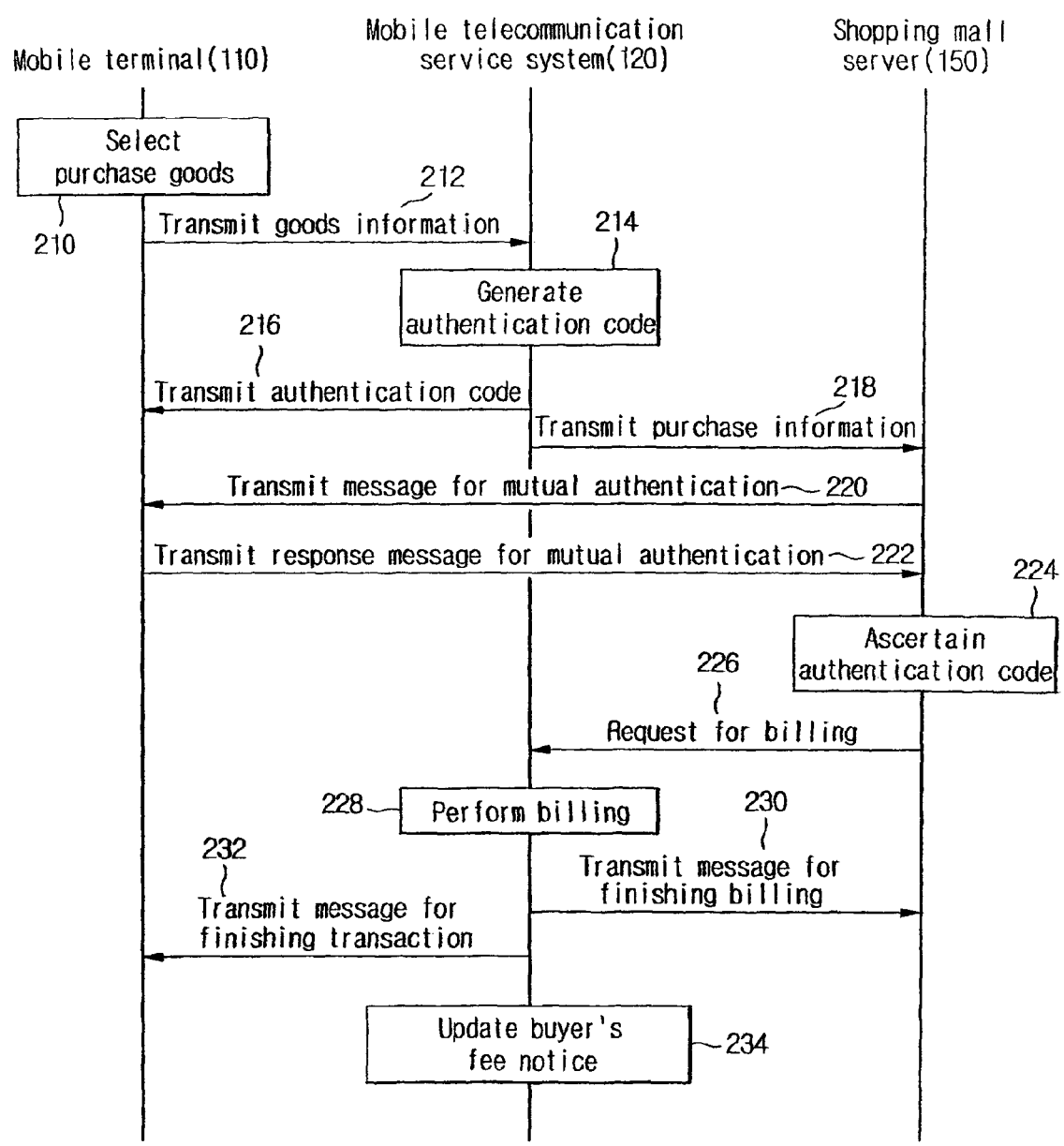
FIG. 2 illustrates a data flow for buying goods and executing as proxy for billing with SMS according to one embodiment of the present invention.
Figure 3:
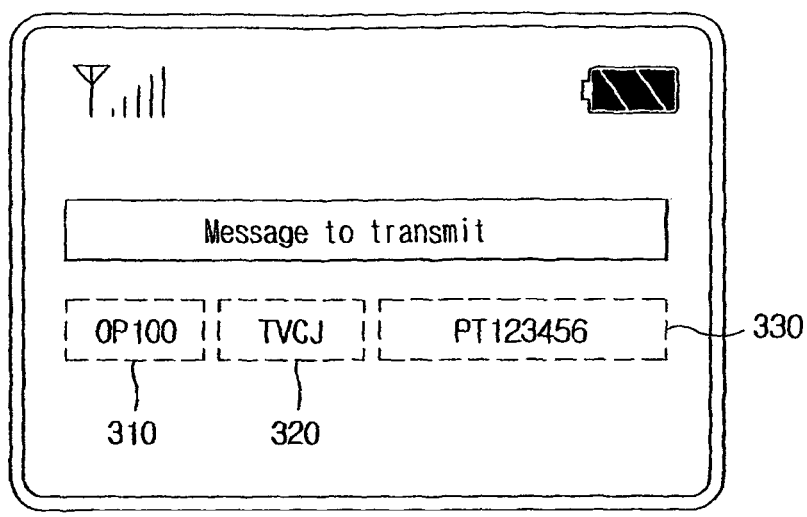
FIG. 3 illustrates a LCD screen of the mobile terminal in step for the buyer transmitting the goods information as to method for buying goods and executing as proxy for billing with SMS, according to one embodiment of the present invention.

FIG. 2 illustrates a data flow for buying goods and executing as proxy for billing with SMS according to one embodiment of the present invention and FIG. 3 illustrates a LCD screen of the mobile terminal in step for the buyer transmitting the goods information as to method for buying goods and executing as proxy for billing with SMS, according to one embodiment of the present invention.

Figure 4:
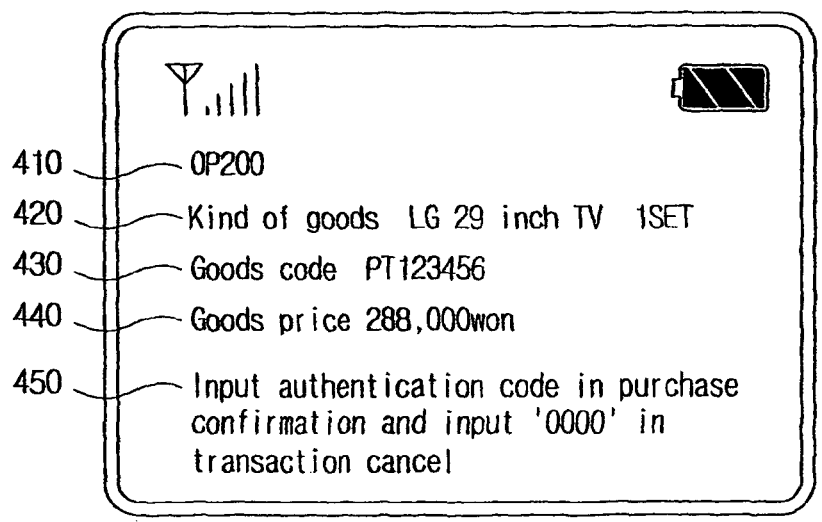
FIG. 4 illustrates a LCD screen of the mobile terminal in step for the mobile communication service system requesting purchase related information to the buyer as to method for buying goods and executing as proxy for billing with SMS according to one preferred embodiment of the present invention.
Figure 5:
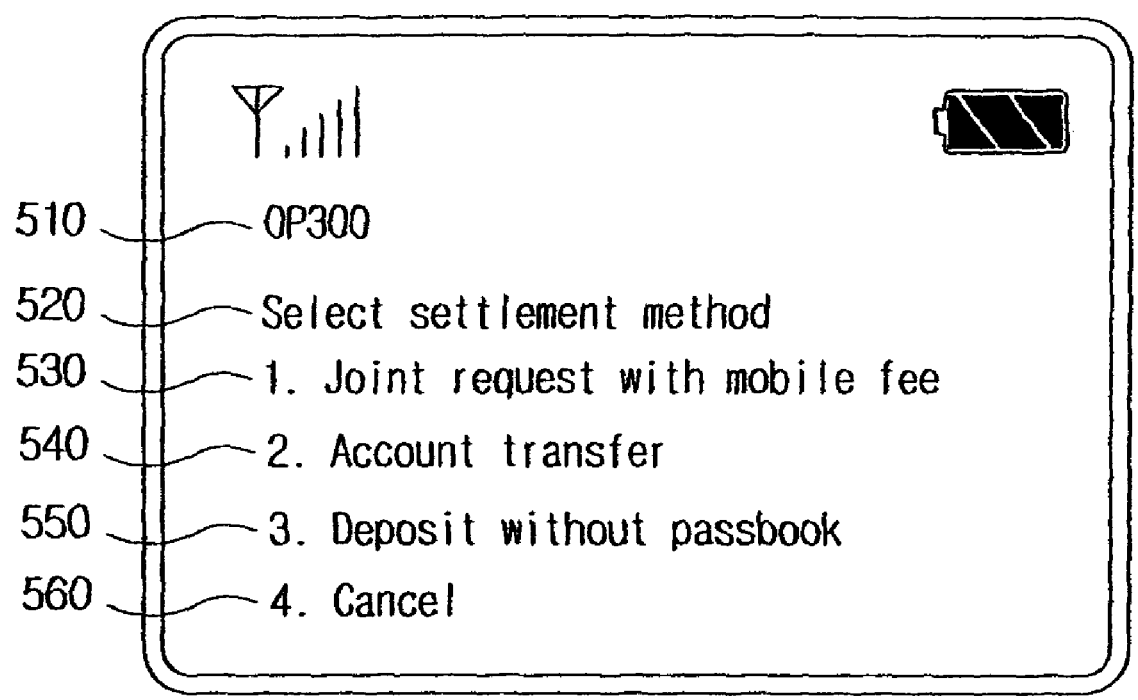
FIG. 5 illustrates a LCD screen of the mobile terminal in step for the buyer selecting a settlement method as to method for buying goods and executing as proxy for billing with SMS, according to one embodiment of the present invention.

FIG. 4 illustrates a LCD screen of the mobile terminal in step for the mobile communication service system requesting purchase related information to the buyer as to method for buying goods and executing as proxy for billing with SMS according to one embodiment of the present invention and FIG. 5 illustrates a LCD screen of the mobile terminal in step for the buyer selecting a settlement method as to method for buying goods and executing as proxy for billing with SMS, according to one embodiment of the present invention.

FIG. 2 illustrates the flowchart of the case that the authentication codes transmitted to the mobile terminal 110 and the shopping mall server 150 are identical and the subject ascertaining whether or not the authentication code is valid is the shopping mall server 150 in the cross certification process.

Drawings illustrated in FIG. 3 to FIG. 5 show LCD screens of the mobile terminal corresponding to the partial steps of processes for buying goods and executing as proxy for billing in FIG. 2.

Therefore, hereinafter the process by the step illustrated in FIG. 2 will be explained with the screen display illustrated in FIG. 3 to FIG. 5 for the convenience of comprehension.

Referring to FIG. 2, the process for buying goods and executing as proxy for billing with SMS is comprised of the steps for the buyer requesting goods and service, permitting the cross certification, providing the billing, and handling the payment.

The mobile telecommunication service system 120 coupled with the mobile terminal 110 and the shopping mall server 150 allows the buyer to purchase goods safely and efficiently, executes as proxy for billing and its payment. Also, the mobile telecommunication service system 120 performs each function in SMSC 130 and MC-T 140.

The MC-T 140 performs the entire process for buying goods and billing therefore including the generation of the authentication code, execution as proxy for billing and the like. The SMSC 130 gives and takes the short message with coupled devices corresponding to transmit/receive signals.

The data transmission/reception between MC-T 140 and the mobile terminal 110 is performed through the SMSC 130.

The data transmission/reception between MC-T 140 and the shopping mall server 150 may be performed through the SMSC 130 or directly. However hereinafter, it will be supposed that the data transmission/reception between the MC-T 140 and the shopping mall server 150 is performed directly not through the SMSC 130 for the convenience.

First of all, a shopper determines goods and service to buy in an online shopping mall or home shopping channel and ascertains the goods code designated by the goods and service.

The buyer inputs the goods code corresponding to the goods to buy with the mobile terminal 110 according to the format designated by the shopping mall company (step 210).

FIG. 3 illustrates a LCD screen of the mobile terminal in the step 210. As illustrated in FIG. 3, the buyer may ascertain the kind of shopping mall and the service code as well as the goods code to input the message for requesting goods to buy with the arranged format.

Referring to FIG. 3, there is illustrated a method for inputting the goods information when the buyer requests to buy any goods provided by a service provider with the transmission function of short message in the mobile terminal, the input field for the goods information includes the service code field 310, the kind of shopping mall field 320 and the goods code field 330.

The service code field 310 is a field to input a command code corresponding to the appropriate step and in this illustration, it is inputted in the form as OP100 meaning the step for inputting the goods information.

The kind of shopping mall field 320 is the field for the buyer inputting the predetermined shopping mall code to indicate a kind of shopping mall company. A shopping mall code is predetermined according to a kind of shopping mall by the mobile telecommunication service system 120 (for example, the shipping mall code of CJ39 home shopping channel for television is TVCJ and the shipping mall code of SAMAUNG online shopping mall is ONSM et cetera) and is transmitted to the shopping mall server 150. The goods code field 330 is the field for the buyer inputting the predetermined goods code to designate a kind of goods to buy. For example, if the goods code of LG 29 inches TV is PT123456, the buyer inputs PT123456 in the field 420 to buy LG 29 inches TV.

The shopping mall server 150 helps the buyer to understand sufficiently the fields for the service code, the shopping mall code and the goods code to be transmitted according to the designated format by exemplifying a sample in television or websites.

Namely, when a buyer wants to buy LG 29 inches TV in CJ39 home shopping channel, the buyer can make a purchase request by inputting a short message like 'OP100 TVCJ PT123456' in the mobile terminal 110, inputting a called number displayed CJ39 home shopping channel, and transmitting it. The SMSC 130 recognizes the called number as the purchase request when the short message is received in the predetermined called number (for example, if CJ39 home shopping channel open the called number as 011-123-4567, the short message is received in 011-123-4567).

FIG. 3 illustrates as if the goods information input field includes only the service code field 310, the shopping mall code field 320 and the goods code field 330, it includes practically the input field for quantity of purchase goods, the field for selecting destination besides.

For example, when nothing is inputted in the input field for quantity of purchase goods, it can be recognized as the purchase request for the quantity to be designated as default (for example, 1). Also, when the predetermined character (for example, Y) is not inputted in the field for selecting destination by the buyer, the corresponding goods can be delivered to the buyer's address storing in the database of the mobile telecommunication service system 120 and when the predetermined character is inputted by the buyer, the separate input screen for the buyer to input delivery can be displayed.

Referring to FIG. 2 again, the mobile terminal 110 transmits the goods information including the buyer's telephone number, customer information and the goods code to SMSC 130 (step 212).

The customer information as a kind of additional field is additional information which the shopping mall server request to the buyer and can include a service code, a kind of shopping mall, a destination code, quantity of purchase goods, a resident registration number and the like.

The SMSC 130 of the mobile communication system 120 transmits the received goods information to the MC-T 140 and the MC-T 140 generates the authentication code for the cross certification between the buyer and the shopping mall server 150 according to the corresponding goods (step 214). The authentication code can be generated by the method for combining numbers randomly by applying arbitrary algorithm et cetera. Corresponding embodiment shows the case that the authentication code generated by the MC-T 140 and transmitted to the mobile terminal 110 and the shopping mall server 150 is the same length and same content in the step 214. The MC-T 140 transmits the authentication code to the mobile terminal 110 through the SMSC 130 (step 216).

The MC-T 140 transmits the purchase information including the buyer's telephone number, the goods code, the authentication code, the customer information et cetera to the shopping mall server 150 (step 218).

The shopping mall server 150 which received the purchase information transmits the message for the cross certification to the mobile terminal 110 of the buyer (step 220). In the place, the transmitted message includes the content for ascertaining the intention of buying the goods corresponding to the received purchase information and the message for requesting the buyer to input the authentication code with the mobile terminal 110.

When receiving the purchase information, the shopping mall server 150 can retrieve the buyer's telephone number and the goods code from the purchase information and generate the cross certification message including the kind of goods, the goods price and the service code corresponding to the goods code automatically. Also, the process for generating the cross certification message can be performed by a manual process, not by an automatic implemented system.

FIG. 4 illustrates a LCD screen of the mobile terminal in the step 220. Referring to FIG. 4, there is illustrated the screen of the buyer's mobile terminal at the time when the shopping mall server transmits the cross certification message and the cross certification message includes the service code field 410, the kind of goods field 420, the goods code field 430, the goods price field 440 and purchase confirmation field 450. The service code field 410 is the field for representing a command code. In this illustration, it is represented as the form of 'OP200' and means the step for inputting the authentication code.

The kind of goods field 420 is the field for representing a kind and quantity of the goods requested by the buyer, the goods code field 430 is the field for representing the goods code of corresponding goods, and the goods price field 440 is the field for representing the goods price of corresponding goods. The purchase confirmation field 450 is the field for inputting the pre-received authentication code and transmitting it to the shopping mall server when there exists the buyer's purchase intention, by ascertaining the kind and code of the goods requested by buyer. On the other hand it is the field for inputting the number (in the illustration, 0000) pre-designated by the shopping mall server for canceling the transaction and transmitting it to the shopping mall server when there is an error in the information related to the goods or there is no intention of buying.

Referring to FIG. 2 again, the mobile terminal 110 transmits the response message for the cross certification corresponding to the message received from the shopping mall server 150 in the step 220 (step 222). In this place, the response message is the transaction approval message including the authentication code received from MC-T 140 by the mobile terminal 110 in the step 216 when the buyer inputs the authentication code and approves the transaction and the message for canceling the purchase request when the buyer cancels the transaction. The called number for receiving the response message is the telephone number of the shopping mall transmitted along with the message transmitted by the shopping mall server 150 in the step 220.

The shopping mall server 150 ascertains whether or not the authentication code in the purchase information received from MC-T 140 in the step 218 and the authentication code in the response message received from the mobile terminal 110 are identical (step 224).

The shopping mall server 150 provides the billing for the goods price which the buyer requested to buy by transmitting the message for requesting the billing to MC-T 140 when the authentication code ascertained in the step 224 is identical (step 226).

The message for requesting the billing includes the information of the goods like the goods price and the quantity of goods et cetera.

The shopping mall server 150 transmits the message for canceling transaction to MC-T 140 in the case of that the authentication code is not identical, the message for canceling purchase requests received, or the response message is not received from the mobile terminal in the predetermined period. The MC-T 140 which is received the message for canceling transaction transmits it to the mobile terminal 110 through the SMSC 130. The MC-T 140 provides the billing for the purchased goods (step 228).

In the corresponding embodiment, the process for billing will be explained on the assumption that the billing and its payment are made with the purchased goods price added to the mobile phone fee.

However, the billing and its payment may be performed in various ways such as account transfer, online payment, and credit card settlement beside.

For example, when the credit card settlement is used, the MC-T 140 can request the buyer's credit information (for example, credit card number, credit card effective period and secret number et cetera), receive it from the mobile terminal 110 through the SMSC 130 and request settlement to the credit card server.

The credit card server requested for the settlement requests the buyer's credit information to MC-T 140, authenticates, settles the payment and transmits the message for the complete settlement to MC-T 140.

The step for selecting the settlement method may be included the former step 228 for the buyer to select the settlement way.

FIG. 5 illustrates a LCD screen of the mobile terminal when the step for the MC-T 140 requesting to select the settlement method to the mobile terminal 110 through the SMSC 130 is included prior to the step 228 for billing. Namely, FIG. 5 illustrates the LCD screen of the mobile terminal in the step for the buyer selecting a settlement method during the process for buying goods and executing as proxy for billing according to one embodiment of the present invention with SMS.

A field 510 is a service code field displayed as OP300 and means a step for selecting a settlement method, and a field 520 is a field for displaying a message like 'select settlement method'.

In the method for the buyer settling the payment of goods, a field 530 means a joint request with mobile phone fee, a field 540 an account transfer, a field 550 an online payment, a field 560 a canceling purchase request, respectively. The buyer selects and inputs one of the selection numbers displayed in the field 530 to 560.

In the corresponding to the embodiment, when the buyer selects the selection number 1, the process for buying goods and billing complies with the step illustrated in FIG. 2 and when the buyer selects the selection number 2 or 3, the step for requesting additional information relating to the purchase to the mobile terminal 110 can be included.

The flowchart can be added or modified as if the step for requesting a payment by an account transfer can be included when the buyer selects the selection number 2 or the step for requesting an online payment can be included when the buyer selects the selection number 3.

Referring to FIG. 2 again, the MC-T 140 transmits the message for the completion of billing to the shopping mall server 150 (step 230).

The MC-T 140 transmits the message for the completion of transaction to the mobile terminal 110 through the SMSC 130 (step 232).

The MC-T 140 generates the transaction particulars including the information like the goods code and the goods price et cetera, and transmits the result to the billing system for providing a billing for the mobile communication service to update the buyer's fee notice (step 234).

In order to determine the destination to deliver the goods in the process for billing and its payment, the step for the buyer inputting an address or the step for informing an address via counselor can be included even though it is not illustrated in the drawings.

According to another embodiment of the present invention, the method and system for buying goods and executing as proxy for billing with SMS can be provided and performs the cross certification in different way to the one embodiment.

For example, there can be the method as if the MC-T 140 generates the 16-bytes authentication code (step 214), transmits the upper 8-bytes to the mobile terminal 110 (step 216) and the lower 8-bytes to the shopping mall server 150.

In the corresponding to the embodiment, the shopping mall server 150 puts the authentication code of pre-stored lower 8-bytes and the authentication code of upper 8-bytes from the mobile terminal 110 in the step 222 together and transmits the total 16-bytes authentication code to MC-T 140 (step 224).

The MC-T 140 ascertains whether the received authentication code and the authentication code generated in the step 214 are identical and then determines whether or not providing a billing. The MC-T 140 provides a billing when two authentication codes are identical. On the other hand it transmits the message for canceling transaction to the shopping mall server 150 and the mobile terminal 110, respectively when two authentication codes are not identical (step 230 and step 232). In the corresponding to the embodiment, the step for putting together two authentication codes divided into upper 8-bytes and lower 8-bytes is performed in the shopping mall server 150, but there can be the embodiment that such step for synthesizing the authentication code is performed in the MC-T 140.

When the MC-T 140 performs the step for synthesizing the authentication code, the MC-T 140 receives the lower 8-bytes authentication code from the shopping mall server 150 and put it together with the predetermined upper 8-bytes authentication code.

Also, in the corresponding to the embodiment, the MC-T 140 ascertains the identity of the authentication code but it is possible to implement the embodiment that the shopping mall server 150 ascertains the identity of the authentication code and transmits the message for requesting the billing or message for canceling transaction to MC-T 140 depending on the results.

Figure 6:
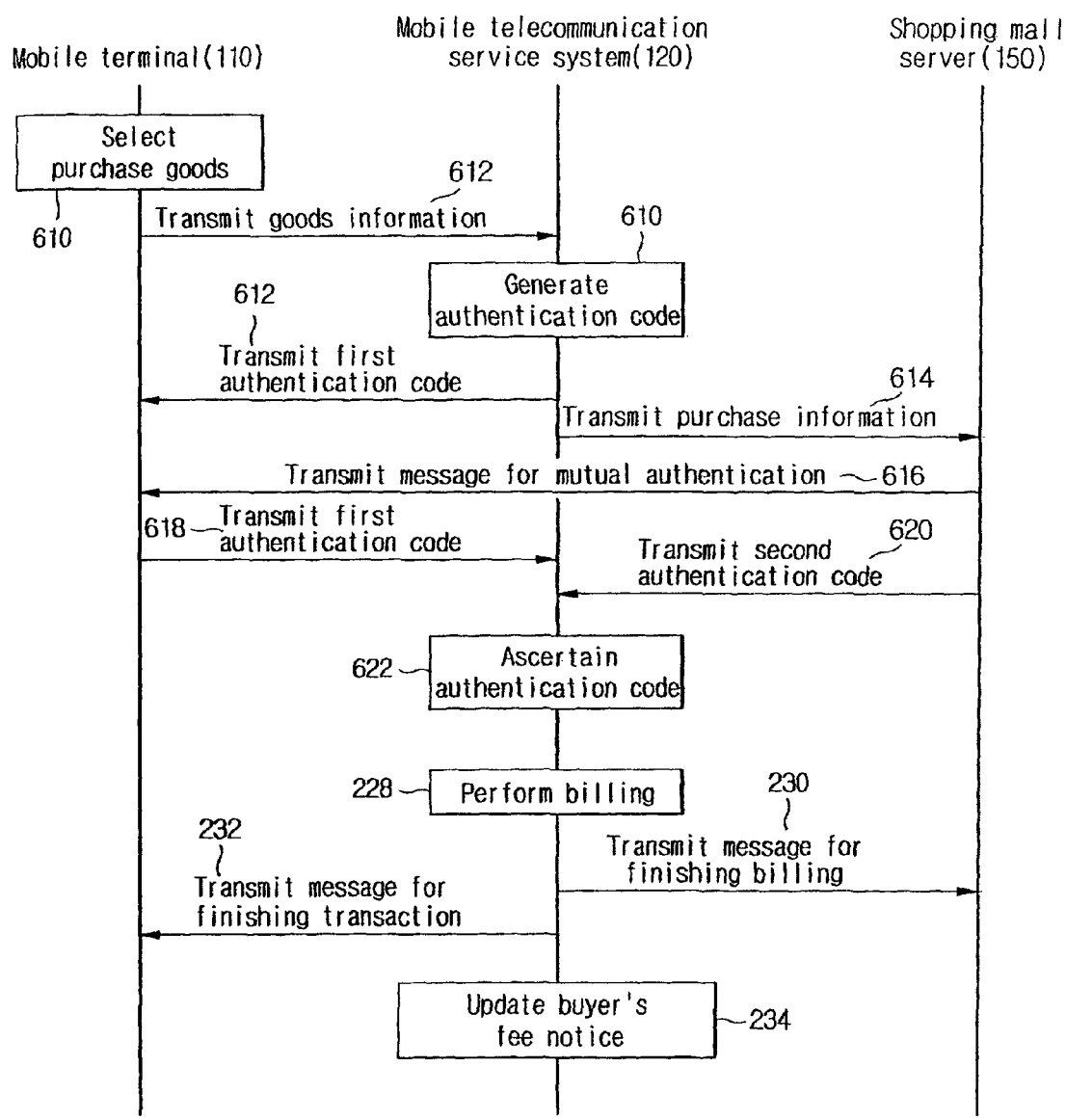
FIG. 6 illustrates a data flow for buying goods and executing as proxy for billing with SMS according to another embodiment of the present invention.

FIG. 6 illustrates a data flow for buying goods and executing as proxy for billing with SMS according to still another embodiment of the present invention.

The corresponding embodiment illustrates the case that if the authentication codes generated and transmitted to the mobile terminal 110 and the shopping mall server 150 by the MC-T 140 are not identical, the subjective ascertaining the authentication code is the MC-T 140 in the process for approving the cross certification.

As explaining the process for buying goods and executing as proxy for billing with SMS referring to FIG. 6, the explanation of parts overlapped with matters explained referring to FIG. 2 before will be omitted.

The step for selecting the purchase goods practically (step 210) and the step for transmitting the goods information (step 212) are performed the same as in FIG. 2. Also, the step for providing a billing (step 228), the step for transmitting the message for the completion of billing and transaction (step 230 and 232) and the step for generating the transaction particulars and updating the fee notice (step 234) are performed the same as in FIG. 2.

The part different from FIG. 2 is the part related the cross certification performed in the step 610 to step 622.

After the MC-T 140 generates and stores two different authentication codes, which are the first authentication code and the second authentication code, the MC-T 140 transmits them to the mobile terminal 110 and the shopping mall server 150 (step 610, step 612 and step 614), respectively.

In another embodiment of the present invention explained before, the shopping mall server 150 puts together the upper and lower the authentication codes, generates total 16-bytes of the authentication code and transmits it to the MC-T 140.

On the contrary, in the embodiment of the present invention, the MC-T 140 receives the first authentication code from the mobile terminal 110 (step 618), receives the second authentication code from the shopping mall server 150 (step 620) and compares them with pre-stored two authentication codes, respectively in the step for generating the authentication code. Unlike the process for approving the cross certification of the present invention, there can be various processes for approving the cross certification such as that if the shopping mall server 150 receives the first authentication code from the mobile terminal 110, generates the synthetic authentication code by a predetermined synthetic algorithm and transmits it to the MC-T (120), the MC-T (120) receives the synthetic authentication code, partitions it by the predetermined partition algorithm and compares two authentication codes stored before, respectively.

Although the present invention has been described in terms of various embodiments, it is not intended that the invention be limited to these embodiments. Modification within the spirit of the invention will be apparent to those experienced in giving or receiving counseling.

In one embodiment, the method for buying goods and executing as proxy for billing with SMS can decrease the construction cost of system selling the goods or service since it is not necessary to construct the high priced system like conventional audio response system.

In another embodiment, the method can simplify the buying process by employing a mobile communication service system executing as proxy for billing and enable for the buyer to safely buy goods with the cross certification through the authentication code.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of buying goods and billing therefor using short message service (SMS) in a mobile telecommunication network, the method comprising:
   receiving information regarding goods which a buyer requested to buy from a mobile terminal, wherein the goods information includes at least a predetermined goods code classified according to goods and/or services associated with a shopping mall server;
   generating, at a mobile telecommunication server, a primitive authentication code corresponding to the goods information in order to approve the mutual authentication between the buyer and the shopping mall server;
   storing, at the mobile telecommunication server, the primitive authentication code;
   partitioning, at the mobile telecommunication server, the stored primitive authentication code into a first authentication code and a second authentication code with the use of a predetermined partition algorithm;
   transmitting the first authentication code to the mobile terminal through a SMS center (SMSC);
   generating purchase information which includes the goods information and the second authentication code;
   transmitting the purchase information to the shopping mall server;
   receiving, at the mobile telecommunication server, the first and second authentication codes from the mobile terminal and shopping mall server, respectively;
   synthesizing, at the mobile telecommunications server, the received first and second authentication codes with the use of a predetermined synthesis algorithm to generate a synthesized authentication code;
   determining, at the mobile telecommunication server, whether or not the synthesized authentication code is identical to the primitive authentication code;
   receiving, at the mobile telecommunication server, a payment option from the mobile terminal, wherein the payment option is one of the following: i) payment via the buyer's mobile phone fees, ii) credit card payment, iii) account transfer, and iv) an online payment; and
   billing, based on the received payment option for the buyer's goods purchase when the synthesized authentication code is identical to the primitive authentication code.

2. The method of claim 1, further comprising:
   transmitting a transaction canceling message to the mobile terminal or the shopping mall server through the SMSC when the synthesized authentication code is not identical to the primitive authentication code;
   billing for the buyer's goods purchase and transmitting a billing completion message to the shopping mall server when the synthesized authentication code is identical to the primitive authentication code; and
   transmitting a transaction completion message to the mobile terminal through the SMSC.

3. The method of claim 1, wherein the billing comprises:
   generating transaction details corresponding to the goods for the buyer to buy wherein the transaction details include at least the goods code and the goods price; and
   transmitting the transaction details to a billing system for billing on a mobile communication service.

4. The method of claim 1, wherein the transmitting of the first authentication code and the transmitting of the purchase information are performed before the billing.

* * * * *